United States Patent [19]

Jarett et al.

[11] Patent Number: 5,732,360
[45] Date of Patent: Mar. 24, 1998

[54] MOBILE TELECOMMUNICATION DEVICE AND METHOD USED FOR CHANGING WIRELESS COMMUNICATION BETWEEN BASE STATIONS OF DIFFERENT KINDS

[75] Inventors: Keith Jarett, Oakland; Roland E. Williams, Walnut Creek, both of Calif.; Michael A. Raffel; Roderick Nelson, both of Redmond, Wash.; Tony S. Lee, Alameda, Calif.; Masud Kibria, Kirkland, Wash.

[73] Assignee: AT & T Wireless Services and Atmel Corp, Middletown, N.J.

[21] Appl. No.: 526,027

[22] Filed: Sep. 8, 1995

[51] Int. Cl.⁶ .................................................. H04B 1/38
[52] U.S. Cl. ........................... 455/552; 455/432; 455/525
[58] Field of Search ................................. 455/56.1, 33.1, 455/33.4, 54.1, 54.2, 89, 186.1, 426, 432, 433, 435, 552, 525; 379/58, 59

[56] References Cited

U.S. PATENT DOCUMENTS

| | | |
|---|---|---|
| 3,588,365 | 6/1971 | McNeilly . |
| 4,086,442 | 4/1978 | Richard . |
| 4,313,035 | 1/1982 | Jordan et al. . |
| 4,508,937 | 4/1985 | Burger et al. . |
| 4,748,655 | 5/1988 | Thrower et al. . |
| 4,752,951 | 6/1988 | Konneker . |
| 4,876,838 | 10/1989 | Selby .......................................... 379/60 |
| 4,953,197 | 8/1990 | Kaewell, Jr. et al. . |
| 4,989,230 | 1/1991 | Gilling et al. . |
| 5,127,042 | 6/1992 | Gilling et al. . |
| 5,127,661 | 7/1992 | Franson et al. . |
| 5,161,168 | 11/1992 | Schilling . |
| 5,197,092 | 3/1993 | Bamburak . |
| 5,210,785 | 5/1993 | Sato et al. . |
| 5,212,684 | 5/1993 | MacNamee . |
| 5,309,502 | 5/1994 | Hirai . |
| 5,353,331 | 10/1994 | Emery et al. . |
| 5,367,558 | 11/1994 | Gilling et al. . |
| 5,388,149 | 2/1995 | Lynn et al. . |
| 5,418,838 | 5/1995 | Havermans et al. . |
| 5,418,839 | 5/1995 | Knuth et al. . |
| 5,442,680 | 8/1995 | Schellinger et al. . |

OTHER PUBLICATIONS

800MHz TDMA Cellular—Radio Interface—Mobile Station —Base Station Compatibility—Digital Control Channel, Telecommunications Industry Association TIA/EIA/IS–136.1 Interim Standard, Dec. 1994.

800MHz TDMA Cellular—Radio Interface—Mobile Station—Base Station Compatibility—Traffic Channels and FSK Control Channel, Telecommunications Industry Association TIA/EIA/IS–136.2 Interim Standard, Dec. 1994.

800MHz TDMA Cellular—Radio Interface—Minimum Performance Standards for Mobile Stations, Telecommunications Industry Association TIA/EIA/IS–137 Interim Standard, Dec. 1994.

800MHz TDMA Cellular—Radio Interface—Minimum Performance Standards for Base Stations, Telecommunications Industry Association TIA/EIA/IS–138 Interim Standard, Dec. 1994.

*Primary Examiner*—Edward F. Urban

[57] ABSTRACT

A remote unit has the ability to switch automatically from a public network to a non-public network comprising of private and residential base stations. In the preferred embodiment, the public network is characterized by cells with each cell having a unique identification signal. Initially, a first switchover from a public network to a non-public network requires the user to manually cause the switchover. The remote unit stores the first identification signal transmitted by the base station from which the remote unit traversed into the region covered by the non-public base station. In addition, the remote unit stores the identification signal associated with a cell of the public network previous to the current cell if the switchover occurred less than two (2) minutes from the exit of the previous cell. In this manner, the remote unit can adaptively learn as it traverses other possible paths from other cells into the region covered by the non-public base station.

31 Claims, 10 Drawing Sheets

5,732,360

MOBILE TELECOMMUNICATION DEVICE AND METHOD USED FOR CHANGING WIRELESS COMMUNICATION BETWEEN BASE STATIONS OF DIFFERENT KINDS

TECHNICAL FIELD

The present invention relates to a mobile telecommunicating device which can communicate wirelessly with a plurality of base stations of a first kind, in a first communication protocol and for communicating wirelessly with at least a base station of a second kind in a second communication protocol wherein the mobile telecommunicating device can switch automatically from the first communication protocol to the second communication protocol.

BACKGROUND OF THE INVENTION

Public wireless communication networks such as cellular networks, are well known in the art. Cellular networks provide for public communication among a plurality of mobile telecommunicating devices. Analog cellular communication networks have typically operated in a frequency range of 824–849 megahertz. Recently, in the United States, the Federal Communication Commission has allocated additional bandwidth in the 1.9 Gigahertz frequency range to permit communication over a more limited range than cellular communication networks. This communication protocol is termed Personal Communication Service ("PCS"). Communication over the PCS network is at a different communication protocol, including frequency, than over a cellular network.

Finally, the IS-136 standard for North American Digital Cellular Communication provides for public, private and residential base stations. As discussed hereinafter, the private and residential base stations shall be collectively referred to simply as "non-public" base stations. The draft standard hence envisions a mobile station having the capability of communicating with a public communication network and with the same mobile telecommunication device being able to communicate over the non-public network with the non-public base stations.

The present invention relates to a mobile telecommunication device and a method for communicating between a first wireless communication network operating at a first protocol and automatically switching to communicate wirelessly with a second communication network in a second protocol. As disclosed, the mobile telecommunication device of the present invention can implement the IS-136 standard or it can also operate between the conventional cellular network and PCS networks or any other combination of two wireless networks.

The difficulty with the design of a mobile telecommunication device that can switch from one communication network to another communication network is for the mobile telecommunication device to be able to know automatically when to switch. Clearly, one solution, albeit undesirable, is for the user to activate the mobile telecommunication device to switch from one wireless network to another wireless network. This manual intervention, however, is clearly undesirable. Another method is for the mobile telecommunication device to be constantly initiating communication with both wireless networks. If and when the mobile telecommunication device is able to establish communication with a second wireless network, then switch over would occur. This clearly is undesirable because it wastes power. Mobile telecommunication devices due to their mobile nature are limited in their portable power capacity. A further problem is that the non-public base station and its associated region of coverage may be located amidst various different cells of a public network, such that the path travelling to the non-public base station may not always pass through the same cells of a public network.

Hence, there is a need for a solution to the foregoing problem.

SUMMARY OF THE INVENTION

In the present invention a mobile telecommunicating device can communicate wirelessly with a plurality of base stations of a first kind in a first communication protocol and communicate wirelessly with at least a base station of a second kind in a second communication protocol. Each of the plurality of the base stations of the first kind and the base station of the second kind transmits and receives wireless signals to and from a respective region with a region of one base station of the first kind overlapping a region of the base station of the second kind. Each of the plurality of base stations of the first kind transmits a distinctive identification signal, which is highly likely to be but is not guaranteed to be, different from the identification signals of another particular base station of the first kind. The mobile telecommunication device has means for storing a first identification signal generated by one of the base stations of the first kind. The device further has means for receiving each of the identification signal in the first protocol from each of the plurality of base stations of the first kind as the mobile telecommunication device travels through the respective regions of the plurality of base stations of the first kind. Finally, the device has means for comparing the identification signal received to the first identification signal stored and to initiate communication in the second communication protocol in the event of a match.

DETAILED DESCRIPTION OF THE DRAWINGS

Figure 1:
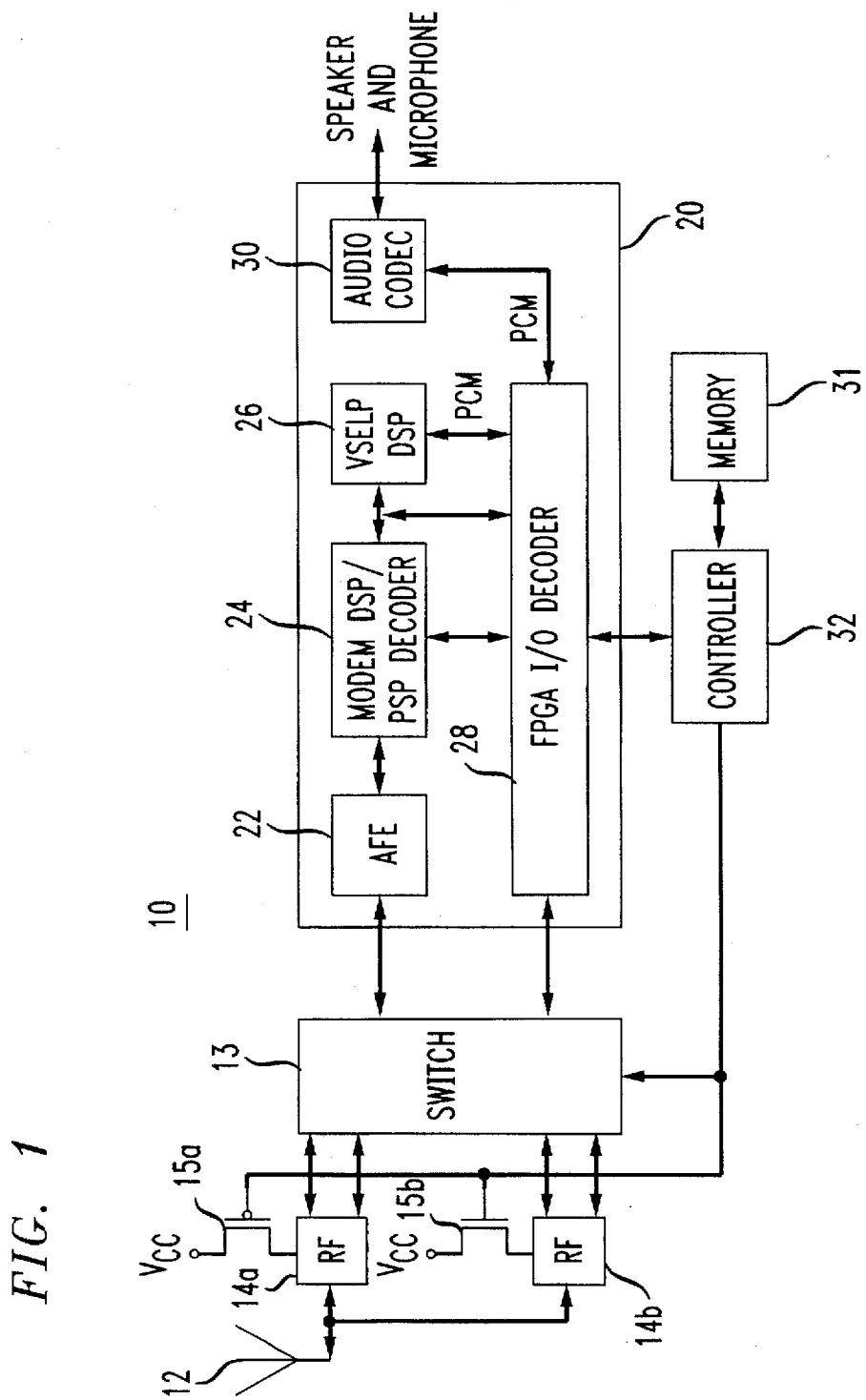
FIG. 1 is a block level diagram of a remote wireless communication unit of the present invention.

Referring to FIG. 1 there is shown a schematic block level diagram of a mobile communication unit 10 of the present invention. In the preferred embodiment, the unit 10 can communicate wirelessly with a "public" carrier, a "private" carrier, and a "residential" carrier, in accordance with the IS-136 standard. For purpose of this discussion hereinafter, the "private" mode and the "residential" mode shall be collectively referred to as the "non-public" mode. However, it should be recognized that the apparatus and method of the present invention is not limited to simply the implementation of the IS-136 standard.

The communication unit 10 comprises an antenna 12 which receives the RF (radio frequency) wireless signal. The RF signal is then processed by either a first RF processing unit 14a or a second RF processing unit 14b. From either the first or second RF processing unit 14(a or b), the signal is then passed to a base band processor 20 through a switch 13. The switch 13 can be a MUX or a pair of N and P type MOS transistors or any other well known electronic switches. The base band processor 20 comprises in AFE (analog front end) 22, which receives the RF signal. The signal from the AFE unit 22 is then received by a Modem DSP/PSP Decoder 24. The signal from the Modem DSP/PSP Decoder 24 is received by a VSELP DSP 26. A FPGA (Field Programmable Gate Array) 28 communicates with the Modem DSP/PSP Decoder 24 and the VSELP DSP 26. The FPGA 28 also communicates with an audio codec 30. In addition, the FPGA 28 is connected to a controller 32. Finally, the audio codec 30 is connected to a conventional speaker and microphone.

As previously discussed, the communication unit 10 in the preferred embodiment implements the IS-136 standard. Thus, the communication unit 10 can also process both analog wireless signals as well as digital by encoded wireless signals. In general, the above-identified components operate in the following manner:

RF processing unit 14(a or b) receives the analog or the digitally encoded RF signal and converts them into an baseband signal for further processing by the based band processor 20. When operating in the digital mode, the RF processing unit 14 also demodulates the received IF signal to produce the analog I,Q signals.

The AFE unit 22 implements analog to digital and digital to analog conversions with associated filtering functions for the I/Q signals. In addition, it provides for four (one not used) channel D/A converter for RF control. It also has one A/D for RSSI (Receive Signal Strength Indicator) measurement.

The Modem DSP/PSP Decoder 24 in the preferred embodiment is a digital signal processor which is ROM coded (TMS 320c51) which implements analog mode processing, modem functions in the digital mode, as well as FACCH (Fast Access Control Channel)/SACCH (Slow Access Control Channel) error control functions. FACCH/ SACCH are defined by the IS-136 standard and is well known in the art. The modem processor DSP/PSP Decoder 24 interfaces with the FPGA I/O decoder 28 through its serial port. Through the FPGA 28, the FPGA 28 then communicates with the controller 32. The Modem DSP/PSP Decoder 24 also maintains the time division multiplex (TDM) bus for communication with the VSELP DSP processor 26 and the audio codec 30 when operating in the analog mode. The Modem DSP/PSP Decoder 24 communicates with the RF processor 14(a or b) through the AFE 22 and through the switch 13.

The VSELP DSP 26 is also a ROM coded DSP (TMS 320c51) which implements the VSELP codec functions, which is a speech compression algorithm. In addition, it performs error control functions associated with the speech frame and echo cancellation. Finally, it communicates with the Modem DSP/PSP Decoder 24 via the TDM port and is powered down during the analog mode operation.

The audio codec 30 implements the speech A to D and D to A conversion and associated filtering. It interfaces directly to the speaker and to the microphone (not shown). The speech samples are exchanged with the Modem DSP 24/PSP Decoder through the TDM port and TDM to pulse code modulation (PCM) conversion circuit in the FPGA I/O decoder 28 during the analog mode operation. In addition, during the digital mode operation, the audio codec 30 interfaces with the VSELP DSP 26 through the PCM bus.

The FPGA I/O decoder 28 consist of a first FPGA1 28a, a second FPGA2 28d, and a PAL (Programmable Array Logic—not shown), for I/O address decoding. The first FPGA1 28a includes timing generation circuitry, wideband data demodulator, sync control interface, and baseband test interface. The second FPGA2 28b includes an interface (UPIF) to interface with the controller 32. In addition, it communicates with the audio codec 30 and the VSELP DSP 26 through the PCM port and has TDM/PCM conversion circuitry. Finally, the second FPGA2 28b has a sampling clock (interrupt control).

The controller 32 is a microprocessor and has an associated memory 31. Alternatively the controller 32 and memory 31 can be integrated in a microcontroller with on-board memory. The controller 32 controls the switch 13 and transistors 15a and 15b which supply power to first and second RF units (14a and 14b), respectively.

Figure 2:
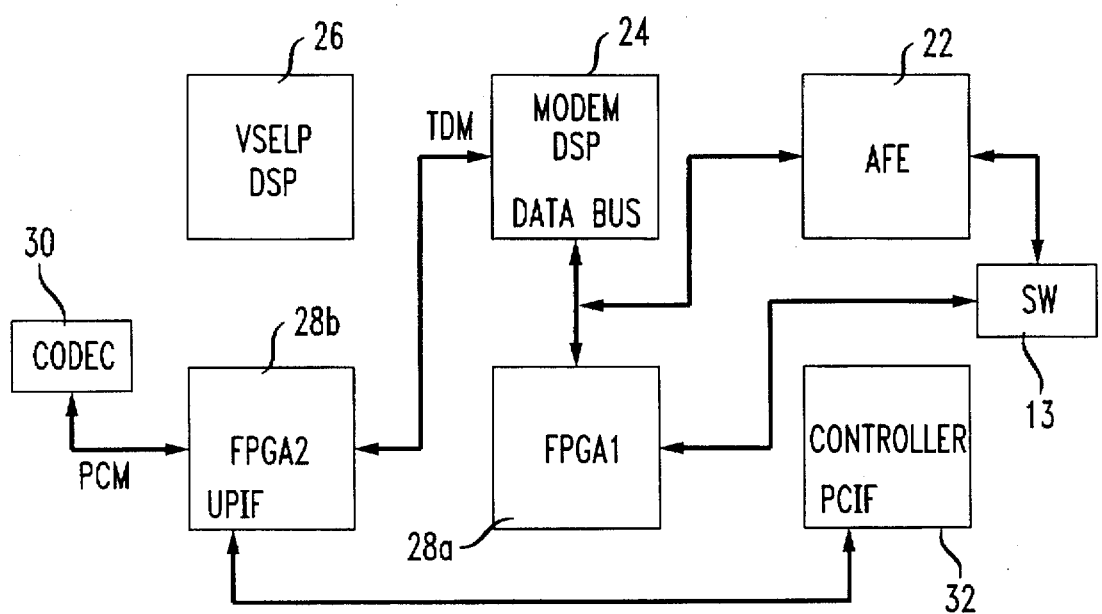
FIG. 2 is a block level diagram of the signal flow path when the wireless communication unit shown in FIG. 1 is operating in the analog mode.

Referring to FIG. 2, there is shown the signal flow for the communication unit 10 when operating in the analog mode. As can be seen, when operating in the analog mode, the VSELP DSP 26 is completely "turned off". The analog wireless signal is received by the RF unit 14 and is supplied to the AFE unit 22. From the AFE unit 22, the signal is supplied to the Modem DSP/PSP Decoder 24. The Modem DSP 24/PSP Decoder through its TDM port communicates with the second FPGA2 28b. From the PCM port of the second FPGA2 28b, the second FPGA2 28b communicates with the codec 30.

Figure 3:
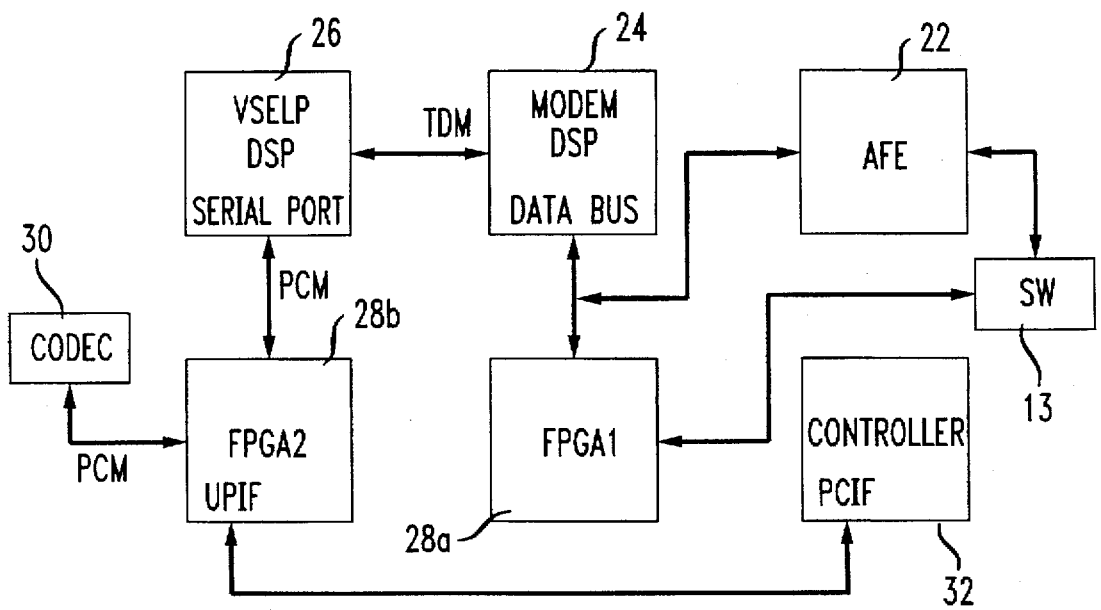
FIG. 3 is a block level diagram of the signal flow path when the wireless communication unit shown in FIG. 1 is operating in a digital mode.

Referring to FIG. 3, there is shown a block level diagram of the signal flow when the communication unit 10 operates in the digital mode. In this mode, the VSELP DSP 26 is actively involved in the processing of the received digitally encoded signal.

Figure 11:
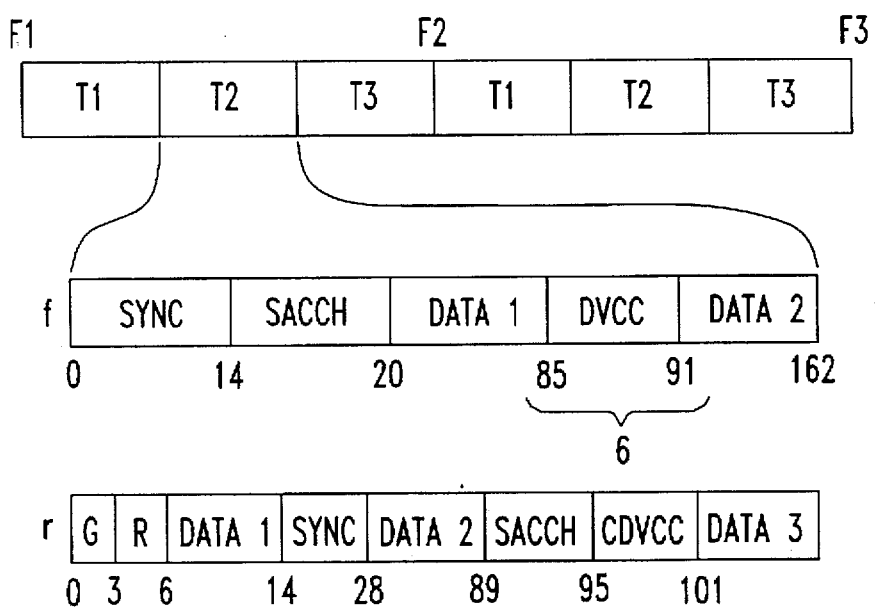
FIG. 11 is a timing diagram of the protocol of communication between like units of FIG. 1, when operating in a digital mode.

Referring to FIG. 11, there is shown a timing diagram of a digitally encoded signal when the communication unit 10 operates in the digital mode, implementing in particular, the IS-136 standard. The communication between a base unit and a mobile unit is divided into a plurality of frames, designated as F1, F2, etc., with each frame lasting 20 msec.

In the digital mode of operation, each 20 msec. frame is further divided into a plurality of time slots, shown as T1, T2 and T3. Using the capability of voice compression as performed by VSELP processor 26, at full rate, 8 kbits/sec., for the same frame at the same frequency, in the digital mode, the base unit can serve to communicate with three different mobile units. Further, when the VSELP DSP 26 is operating at half rate compression i.e., 4 kbits per second, communication between the base unit and a plurality of mobile units can occur using a 40 msec. frame with each frame divided into six different time slots or serving six users.

Each time slot Tn can accommodate the transmission of 162 QPSK symbols or 324 bits. The base unit and the mobile unit 10 communicate over separate frequency channels thereby accomplishing full duplex transmission. The protocol of transmission from the base unit to the mobile unit is shown and designated as f (for forward). The protocol of transmission from the mobile unit to the base unit is shown and is designated as r (for reverse). In the forward protocol, the IS-136 standard dictates that the digitally encoded signal begins with 14 symbols of synchronization signal followed by 148 symbols of data signal, with 6 symbols of DVCC (a marker signal) located in the middle of the data field between symbols 85–91. Thus, within each forward time slot, transmission of 162 symbols include sync and data.

Figure 4:
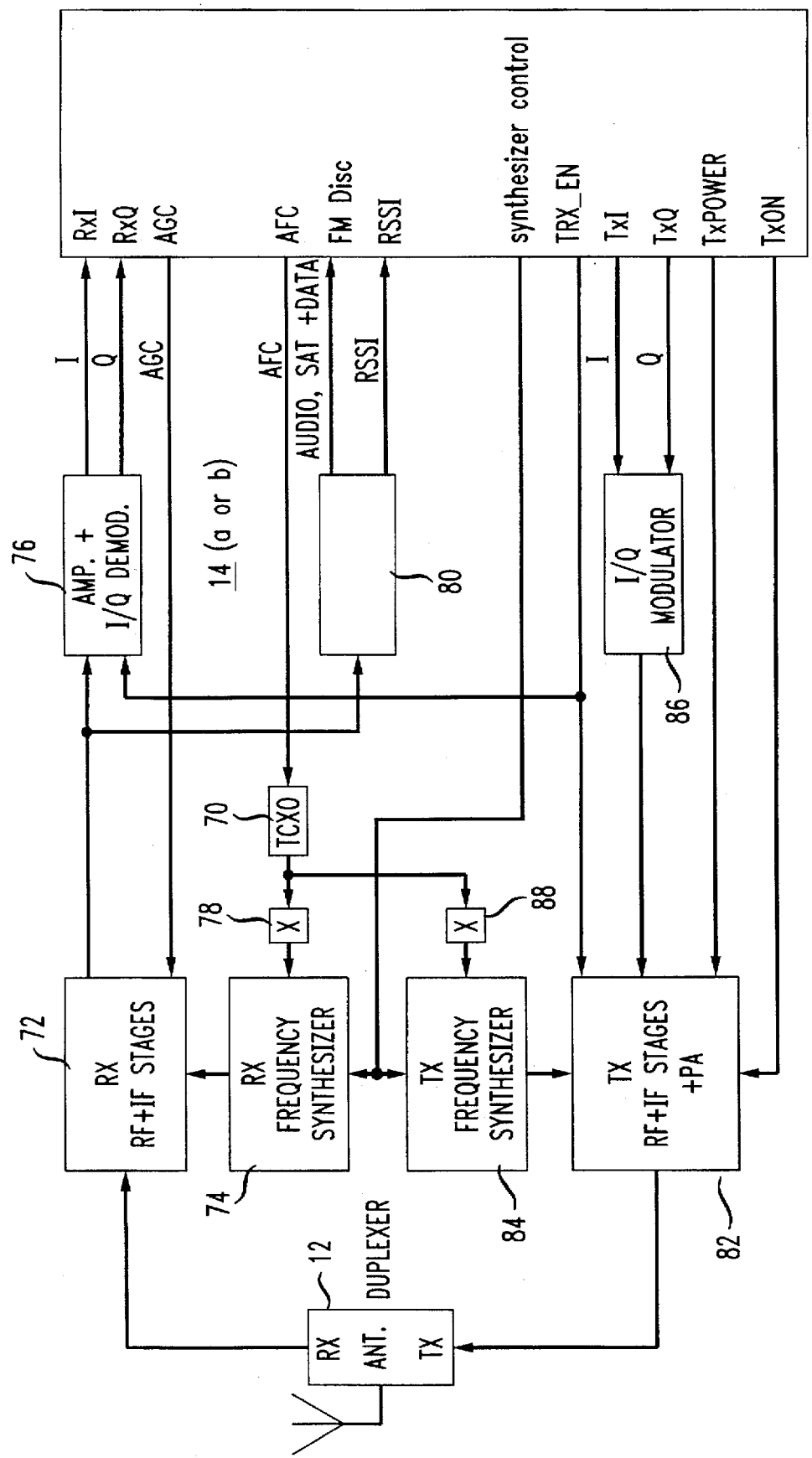
FIG. 4 is a detailed block level diagram of one of the RF unit portion of the communication unit shown in FIG. 1.

Referring to FIG. 4, there is shown a detailed block level diagram of the RF processing unit 14. The RF processing unit 14 receives the signal from the antenna 12 through a duplexer. The received signal is supplied to an RF+IF stage 72. The RF+IF stage 72, as is well known in the art, has an RF filter, low noise amplifier which serves to filter and amplify the received signal, and an RF to IF converter to convert the received RF signal into an intermediate frequency signal. The conversion is based upon a difference frequency signal generated by an RX frequency synthesizer 74. The frequency selected by the RX frequency synthesizer 74 is based upon a signal supplied from a temperature compensated crystal oscillator 70, passing through an appropriate multiplier 78.

The output of the RF+IF stage 72 is then supplied to an amp and I/Q demodulator 76 whose gained is selected by an automatic gain control signal AGC. The outputs of the amp+I/Q demodulator 76 are the analog I and analog Q signals.

In the transmit mode, the RF processing unit 14 comprises similar components as the above. The analog I and analog Q signals are supplied to an I/Q modulator 86, which modulates the analog I,Q signals on an IF carrier signal. The output of the I/Q modulator 86 is then supplied to an RF+IF stage 82. The RF+IF stage 82 converts up the output of the I/Q modulator 86 into an RF signal for transmission by the antenna 12. The frequency to convert from the intermediate frequency to the RF frequency is controlled by the TX frequency synthesizer 84. The TX frequency synthesizer 84 also receives the output of the temperature compensated crystal oscillator 70 multiplied by an appropriate multiplier 88.

Figure 5:
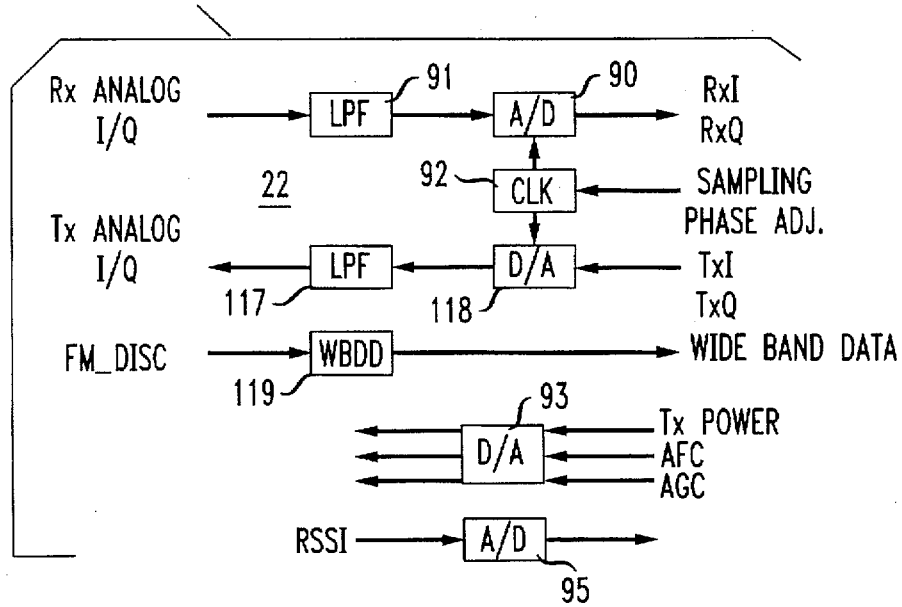
FIG. 5 is a detailed block level diagram of the Analog Front End portion of the communication unit shown in FIG. 1.

Referring to FIG. 5, there is shown a detailed block level diagram of the AFE unit 22. The AFE unit 22 comprises a first LPF (low pass filter) 91. The first LPF 91 receives the received analog I/Q signals from the RF unit 14. The output of the LPF 91 is then supplied to an A-to-D converter 90 from which the digital RxI and the digital RxQ signals are produced. The A-to-D converter 90 also receives a clock signal from a clock 92. The clock 92 is adjusted by a sampling phase adjustment signal (which will be described hereinafter). The AFE unit 22 also comprises a D-to-A converter 118. The D-to-A converter 118 receives the transmit digital I and Q (Tx I/Q) signals and converts them into analog Tx I/Q signals. The D-to-A converter 118 also receives the clock signal from the clock 92. The analog Tx I/Q signals are then supplied to a second LPF 117. The output of the second LPF 117 is then supplied as the Tx analog I/Q signals and are provided to the RF unit 14.

The AFE unit 22 also comprises a WBDD (wide band data demodulator) 119. From the WBDD 119, the signal wide band data is produced. The wide band data demodulator signal is an analog control channel. It is disclosed herein only because the IS-136 standard requires that the communication unit 10 can handle both analog and digital communication. It is not used during digital communication. The AFE unit 22 also comprises a D-to-A converter 93 which receives the control signals of Tx Power, AFC, and AGC. These digital signals are converted into an analog signal and are supplied to the RF unit 14 to control the RF unit 14. Finally, the AFE unit 22 receives the RSSI (receive signal strength indicator) signal and digitizes it by the A-to-D converter 95.

Figure 6:
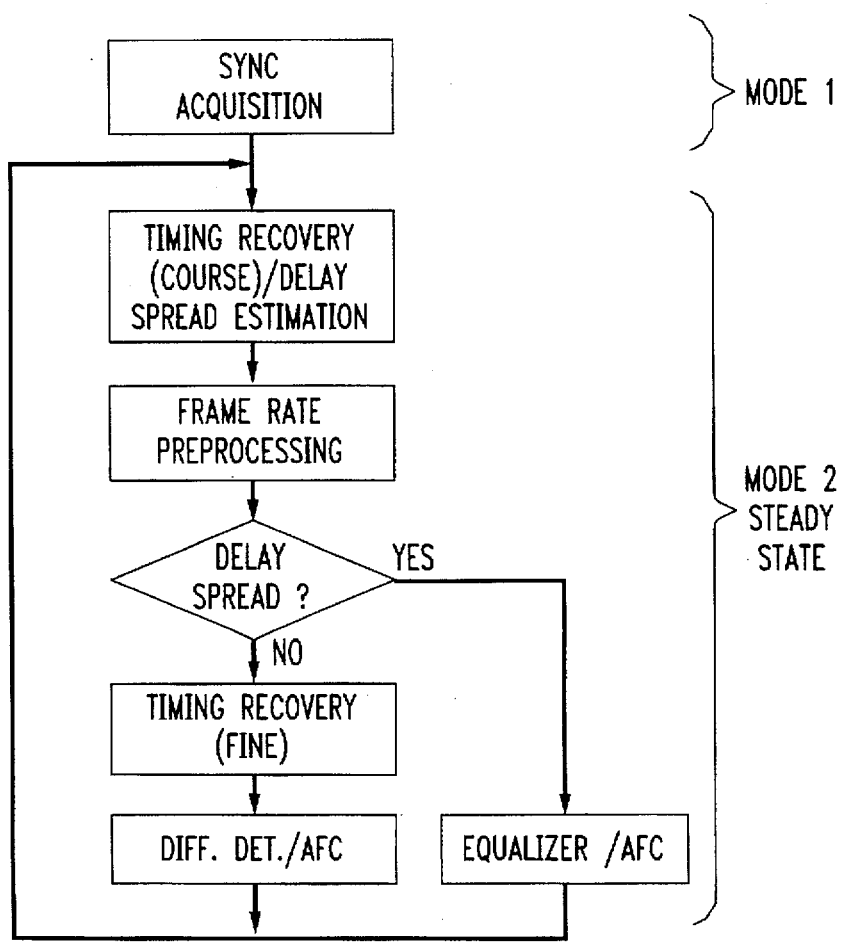
FIG. 6 is a flow chart showing the operation of the software used in the Modem DSP/PSP Decoder of the communication unit shown in FIG. 1, when the Modem DSP/PSP Decoder is operating in the receive mode and having two modes of operation: sync acquisition mode and steady state mode.
Figure 9:
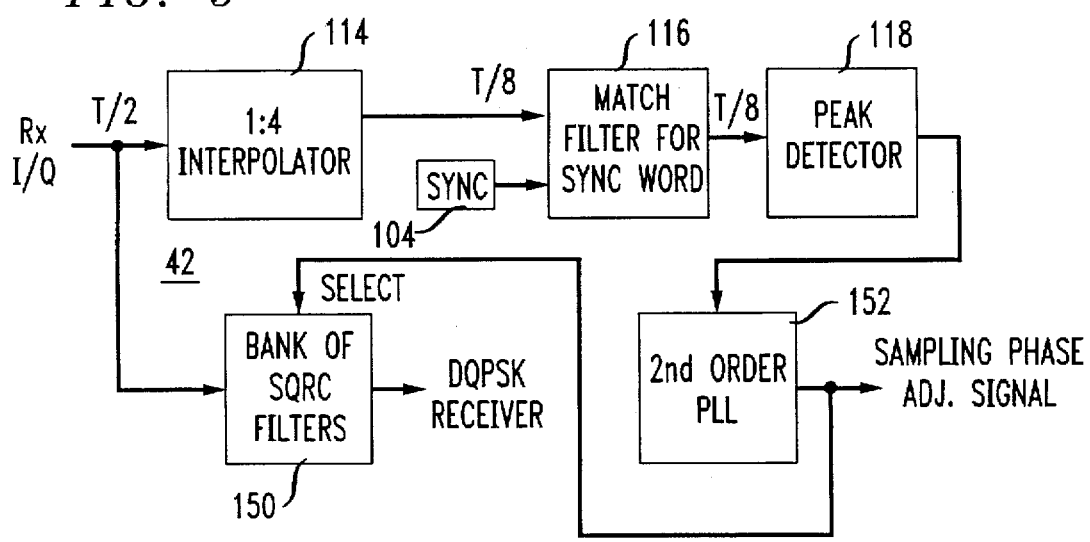
FIG. 9 is a detailed functional block diagram of the timing recovery function during the steady state mode shown in FIG. 8.

Referring to FIG. 6, there is shown a flowchart of the operation of the software used in the Modem DSP 24 when the Modem DSP 24 is operating in the receive mode. When operating in the receive mode, the Modem DSP 24 has two modes of operation: a sync acquisition mode, and a steady state mode. In the sync acquisition mode, the operation occurs at the start of each communication session. Once communication has been established, the software proceeds into the steady state mode. There, the operation occurs once every frame or once every 20 millisec. Further, during the steady state, the Modem DSP 24 initially performs a timing recovery operation 42 which is shown in FIG. 9 and which will be explained in greater detail. After the timing recovery operation 42, the Modem DSP/PSP Decoder 24 operates on the signal shown in block level diagram form in FIG. 10 and will be discussed in greater detail hereinafter.

Figure 7:
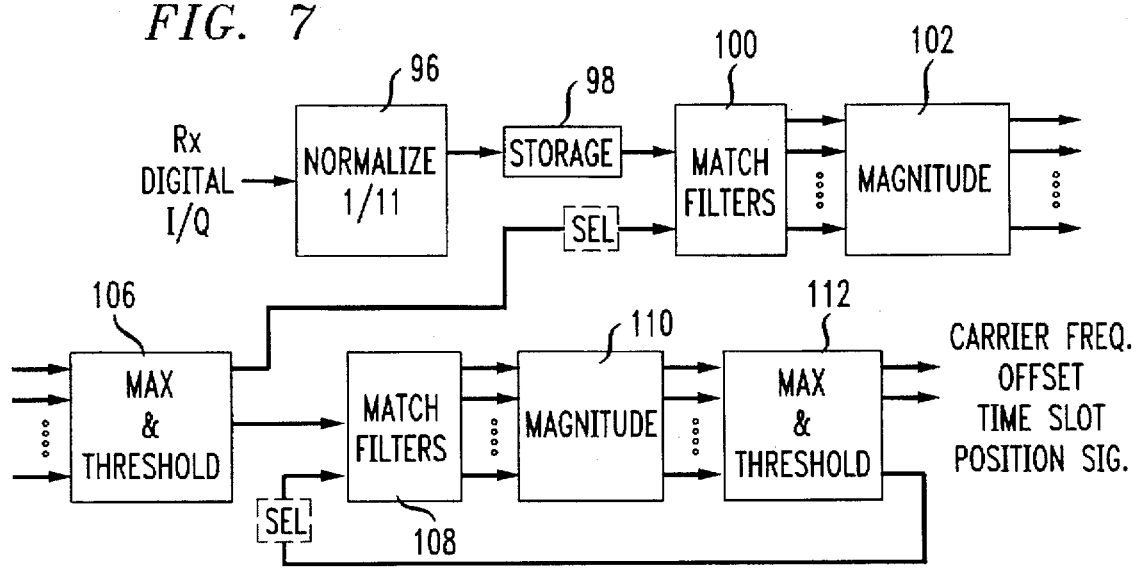
FIG. 7 is a functional block diagram of the Modem DSP/PSP Decoder with its software, operating in the sync acquisition mode.

Referring to FIG. 7, there is shown a detailed functional block diagram of the sync acquisition mode of operation for the Modem DSP 24/PSP Decoder. The digital I/Q received signals from the AFE unit 22 are supplied to a normalizing circuit 96. The normalizing circuit 96 serves to normalize the magnitude or the amplitude of the digitized I,Q signals from the A to D converter 90.

From the normalizing circuit 96, the digitally encoded signal is then stored in a storage unit 98, which is just a buffer. As will be explained hereinafter, the storage 98 stores at least 15 symbols (or 30 samples) which is the length of the synchronization signal portion of the digitized signal. The stored signals are then supplied to a first bank of matched filters 100. Each of the filters in the first bank 100 is adapted to receive the digital signal from the storage 98 and to filter this digital signal through a frequency range different from one another. Thus, the output of the first bank of matched filters 100 is a plurality of filtered digital signals. The plurality of filtered digital signals are supplied to a plurality of first magnitude circuits 102. Each of the plurality of first magnitude circuits 102 determines the magnitude of the filtered digital signal from the first bank of matched filters 100. The output of the first magnitude circuits 102 is yet another plurality of digital signals which are supplied to a first maximum and threshold circuit detector 106.

The output of the first maximum and threshold circuit detector 106 serves to detect the filtered digital signal having the maximum magnitude. In addition, the first maximum and threshold circuit 106 selects the matched filter from the first bank of matched filters 100 that generated the signal having the maximum output.

The output of the first maximum and threshold circuit 106 is supplied to a second bank of matched filters 108. Each of the filters in the second bank of matched filters 108 has a fine frequency offset from one another and having a different filter coefficients from one another. The output of the second bank of matched filters 108 is a plurality of fine filtered digital signals which are supplied to a second magnitude circuit 110.

The second magnitude circuit 110, similar to the first magnitude circuit 102, comprises a plurality of circuits each of which receives a fine filtered digital signal and determines the amplitude or the magnitude thereof. The output of the second magnitude circuit 110 is a plurality of signals which are supplied to a second maximum and threshold circuit detector 112. The second maximum and threshold detector 112 selects the digital signal having the maximum amplitude as the output thereof. In addition, the second maximum and threshold circuit 112 selects the filter from the second bank of matched filters 102, producing that output. Finally, the output of the second maximum and threshold circuit 112 is an initial carrier frequency offset signal to correct the carrier frequency to the AFC (automatic frequency control), and a time slot position signal. The time slot position signal is used internally to control the start and stop of each subsequent frame.

Figure 8:
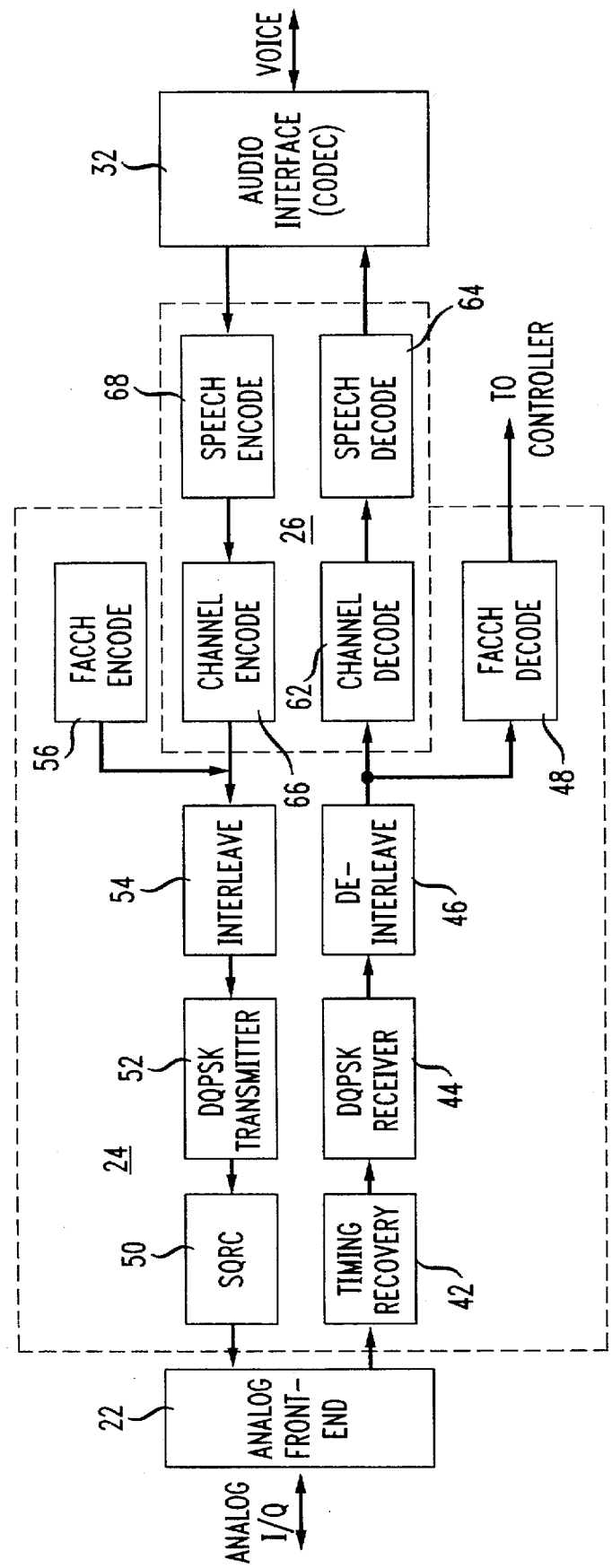
FIG. 8 is a functional block diagram of the Modem DSP/PSP Decoder with its software, operating in the steady state mode

Referring to FIG. 8, there is shown a block level functional diagram of the operation of the Modem DSP/PSP Decoder 24 with the software therein when operating in the steady state mode. In the steady state mode, the Modem DSP 24/PSP Decoder performs SQRC filtering function 42 and 50 (for receive and transmit) and timing recovery 42 (for receive), DQPSK modulation 44 and 52 (again receive and transmit respectively) and frame interleaving/De-interleaving 46 and 54 (receive and transmit respectfully), and FACCH decode and encode 48 and 56 (receive and transmit respective). In addition, the VSELP DSP 26 performs channel decode and encoding 62 and 66 (receive and transmit, respectively) and speech decode and encode 64 and 68 (receive and transmit respectively).

Referring to FIG. 9, there is shown a detailed block level functional diagram of the timing recovery function 42 performed by the Modem DSP 24/PSP Decoder when operating in the steady state mode.

The Rx I/Q signals from the second maximum and threshold circuit detector 112 are supplied to a 1:4 interpolator 114. The output of the interpolator 114 is then supplied to a third matched filter 116. The matched filter 116 also receives the stored sync signal from a storage location 104. The matched filter 116 is a single filter and it matches each input sample symbol with the stored sync signal from the storage location 104. After each match, the input signal is shifted by T/8, or by one input sample and then is matched again with the sync signal from the storage location 104. Thus, the output of the matched filter 116 is a signal operating at the T/8 rate. The outputs of the matched filter 116 are then supplied to a peak detector 118. The peak detector 118 receives the plurality of outputs from the matched filter 116, being supplied thereto at the T/8 rate, and determines the output having the highest peak value. The output of the peak detector 118 is the value imax, the use of which will be discussed hereinafter. The output from the peak detector 118 is then supplied to a second order phase lock loop 152. The second order phase lock loop 152 has an internal variable AVG-POS, the use of which will be described hereinafter in greater detail. The output of the second order phase lock loop 152 is the sampling phase adjustment signal which is supplied to the clock 92 of the AFE 22 shown in FIG. 5. The received digital Rx I/Q signals at the T/2 rate are also supplied to a bank of SQRC filters 150. The output of the second order PLL 152 is used to select the appropriate SQRC filter from the bank of SQRC filters 150. The output of the bank of SQRC filters 150 is then supplied to the DQPSK receiver 44.

The output of the second order PLL 152 is the signal Avg-pos(n+1). It is supplied to the AFE unit 22 and is adjusted once every frame during the idle period. The coefficient filter of each of the bank of SQRC filters 150 is tuned to a different sampling phase adjustment. Thus, the output of the second order PLL 152 selects one of the coefficient filters from the bank of SQRC filters 150.

Figure 10:
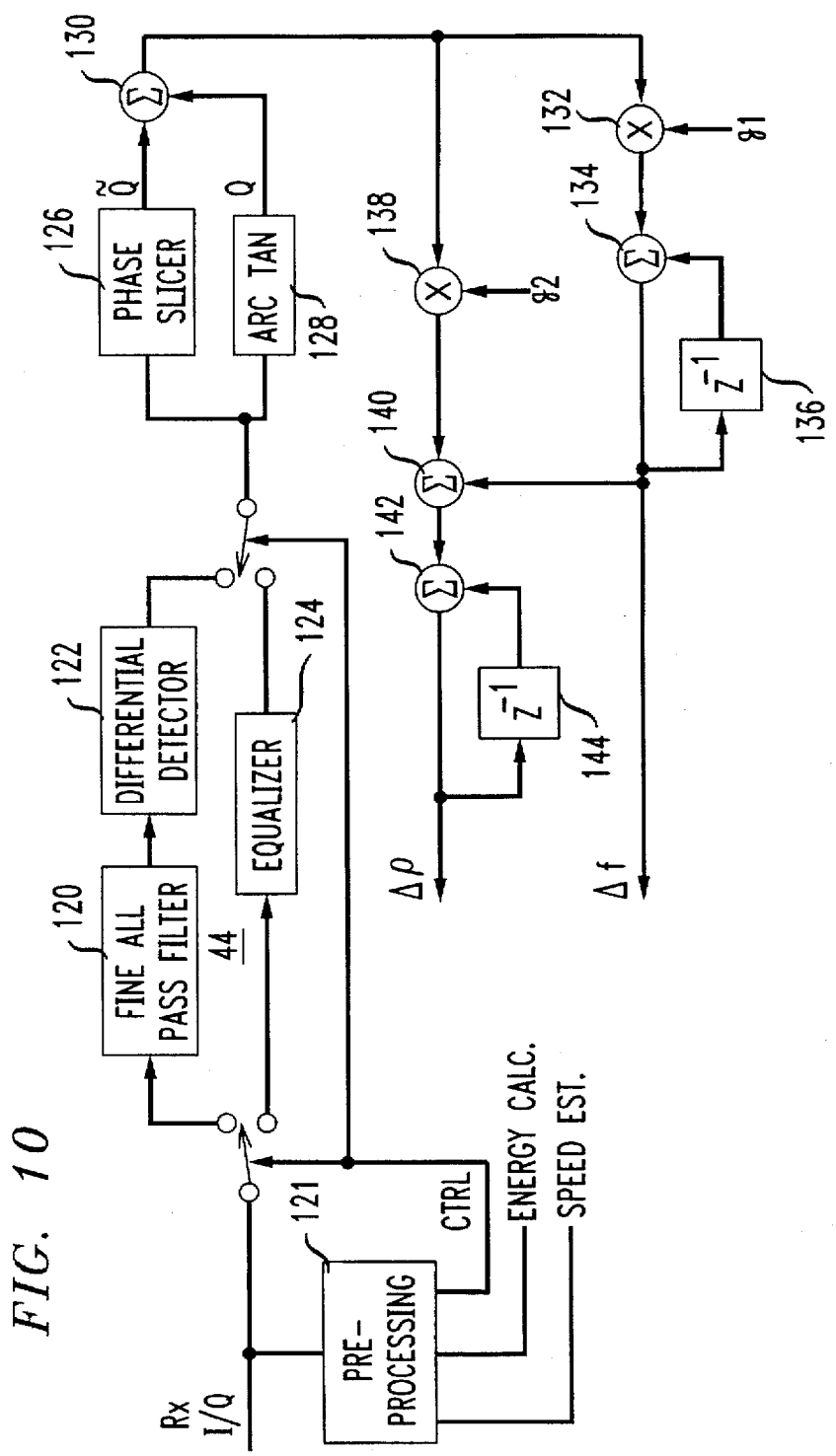
FIG. 10 is a detailed functional block diagram of the DQPSK receiver function during the steady state mode shown in FIG. 8.

Referring to FIG. 10 there is shown a detailed block level diagram of a portion of the DQPSK receiver 44. The DQPSK receiver 44 receives each symbol as the output of the timing recovery function 42. The digital Rx I/Q symbols are supplied to a pre-processing unit 121 which generates the control signals: speed estimation, energy calculation, and CTRL. The CTRL signal controls the DQPSK receiver 44 in its two modes of operation. In one mode, each symbol from the output of the timing recovery 42 is supplied to a fine all pass filter 120. From the fine all pass filter 120, each symbol signal is supplied to a differential detector 122. From the differential detector 122, the symbol signal is then supplied to a phase slicer 126 and an arc tangent processor 128.

In another mode of operation, each symbol from the timing recovery function 42 is supplied to an equalizer 124. The equalizer 124 operates on all the symbols received during the assigned time slot. After the equalizer 124 has performed its operation (to be discussed hereinafter), each symbol is outputted from the equalizer 124, one at a time. Each symbol signal from the equalizer 124 is also supplied to the phase slicer 126 and at the same time to the arc tangent processor 128.

Each of the symbol signal from the equalizer 124 or the differential detector 122 is received simultaneously by the phase slicer 126 and the arc tangent processor 128. The phase slicer 126 operates upon the symbol signal by quantizing the input phase into one of a plurality of pre-determined constellation points (i.e. 45°, 135°, 225°, 315°) and generates the phase signal θ. The arc tangent processor 128 receives the same symbol signal and serves to operate on the symbol signal received to determine the arc tangent of its phase. The output of the arc tangent processor 128 is the phase signal θ. The phase signal θ and the phase signal θ are supplied to a first subtractor (or adder with a negative input) 130 which generates the phase error signal (θ–θ). The phase error signal (θ–θ) is then supplied to a first multiplier 132 to which a constant $g_1$ is multiplied. Thereafter, the output of the first multiplier 132 is supplied to a second adder 134 to which the frequency signal output from a prior operation on a prior symbol was stored in the storage 136. From the second adder 134, the adjustment to the frequency to the next symbol or the frequency error signal, is then generated. Thus, the frequency error signal which is generated is in accordance with:

$$\Delta f(n+1)=\Delta f(n)+g_1(\theta(n)-\theta(n)).$$

The output of the first adder 130 is also supplied to a second multiplier 138 to which the constant $g_2$ is supplied.

The output of the second multiplier 138 is then supplied to a third adder 140 to which the frequency error signal Δf(n) from a prior symbol is also supplied. The output of the third adder 140 is supplied to a fourth adder 142 to which the carrier phase φ signal from a prior bit has been supplied and stored in storage 144. The output of the fourth adder 142 is a carrier phase error signal and is calculated in accordance with:

$$\phi(n+1)=\phi(n)+g_2(\theta(n)-\theta(n))+\Delta f(n).$$

Figure 12:
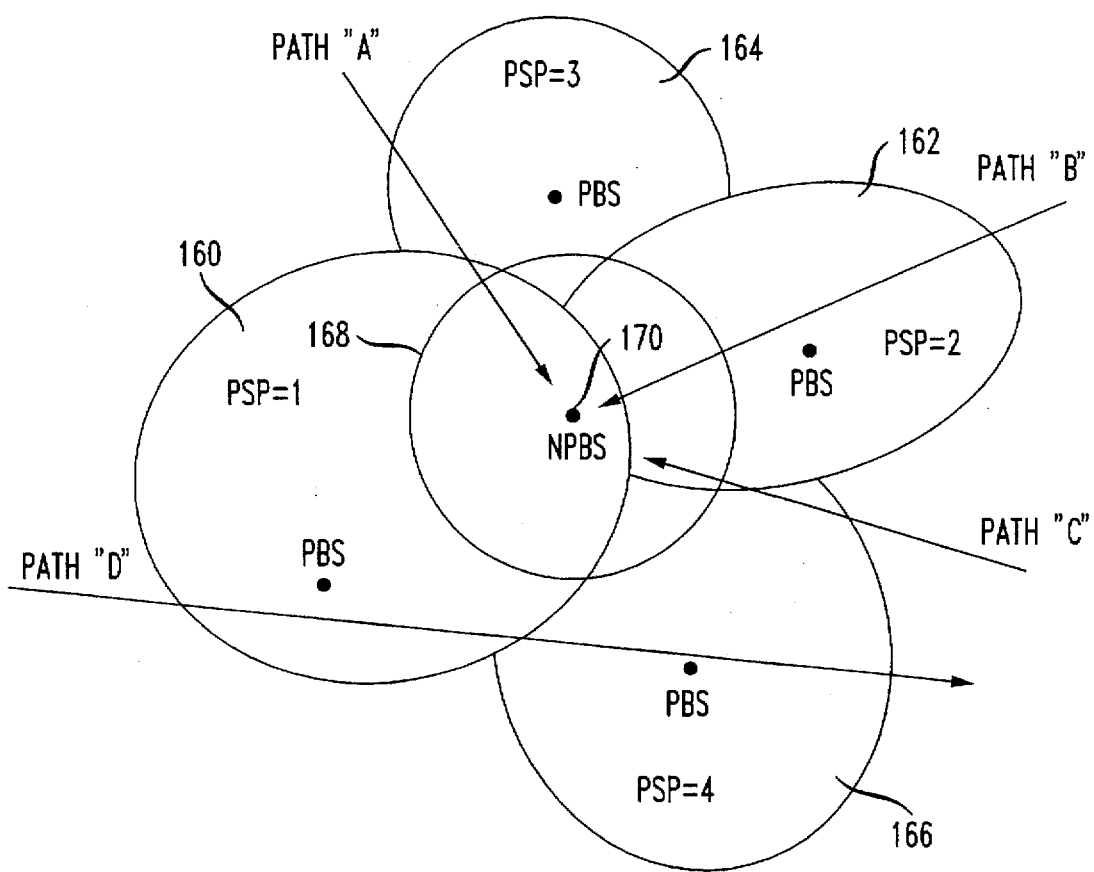
FIG. 12 is a topographical view of the remote wireless communicating unit of the present invention, communicating in a "public" mode, and as it nears a "non-public" PBS base unit switching to communicate with the PBS unit.

Referring to FIG. 12 there is shown a topographical view of a region through which the mobile unit 10 of the present invention can traverse and communicate wirelessly. As previously stated, in the preferred embodiment, the wireless remote unit 10 communicates with a public network, comprising of a plurality of cells, in accordance with the IS-136 standard. In the public network, as is well known in cellular technology, the remote communication unit 10 communicates with a plurality of cells as it traverses from one cell to another. As shown in FIG. 12, each cell, e.g. 160, 162, 164, and 166, has a an associated Public Base Station (PBS), which transmits and receives RF signals from its respective region of operation. If a remote unit 10 were located in that region, the remote unit 10 can communicate with the public network. The cells, 160, 162, 164, and 166, overlap one another to a certain extent because as a remote unit 10 traverses from one cell region to another, there must be a location at which the "handoff" in communication occurs from one cell to another. In addition, as shown in FIG. 12, in accordance with the IS-136 standard, a non-public base station (NPBS) 170 is located at a location which is also within one or more of the cells (160, 162, 164 or 166). The NPBS 170 also has a region 168 within which it can communicate with any wireless remote unit 10 located in that region 168.

The region 168 covered by the NPBS 170 overlaps with one or more of the cells 160, 162, 164 and 166 of the public network. Typically, the NPBS 170 is located in a building or home where a number of cells of the public network can cover and further where the strength of the wireless signals from the public network on one side of a wall of the structure may be different from the strength of the radio signal on the other side of the wall.

As discussed heretofore, the remote unit 10 has the capability of switching automatically from the public network to the non-public network as it traverses cells covered by the public network into a region covered by the non-public network. However, a problem can be seen by referring to FIG. 12 in that the path by which the remote unit 10 traverses the public cells to reach the non-public base station 170 can vary from occasion to occasion. As shown in FIG. 12, if the remote unit 10 traverses the path shown as "A", it would pass through cell 164 and 160 of the public network before entering into the region 168 covered by the NPBS 170. If the remote unit 10 traversed path labeled "B", it would pass through cell 162 of the public network before reaching the region 168 covered by the NPBS 170. Finally, with respect to path "C", the remote unit 10 would pass through cell 166 and cell 162 of the public network before reaching region 168 of the non-public base station 170. The remote unit 10, therefore, must take into account all of the possible various different paths in moving from one cell of the public network to the region of the non-public base station.

In accordance with the IS-136 standard, each of the cells of the public network is characterized by a public service profile ("PSP") identification signal. For an analog cellular network, the PSP potentially consists of the analog control channel number and the digital color code number. For a digital cellular network, the PSP preferably consists of the digital control channel number and the digital verification color code number. To further reduce the possibility of the PSP of the public network from being confused with an identification signal from the NPBS 170, the PSP can consists of the foregoing plus a system ID number, which is a characteristic signal of a cellular network, and is well known in the art. Thus, with the PSP signal, the remote unit 10 can identify the particular cell of the public network in which it traverses from other public cells and distinguish a public cell from a region of a non-public base station.

In the method and apparatus of the present invention, the Modem DSP 24 also serves as a PSP Decoder. Thus, the Modem DSP/PSP Decoder 24 recognizes and decodes the signal from, e.g. cell 160, as having a PSP="1", when the remote unit 10 first enters the cellular region 160 and remains in region 160. The PSP identification signal is then supplied to the FPGA I/O decoder 28 which then is supplied to the controller 32. The controller 32 stores the various PSP signals decoded by the Modem DSP/PSP Decoder 24 in its associated memory 31.

Figure 13:
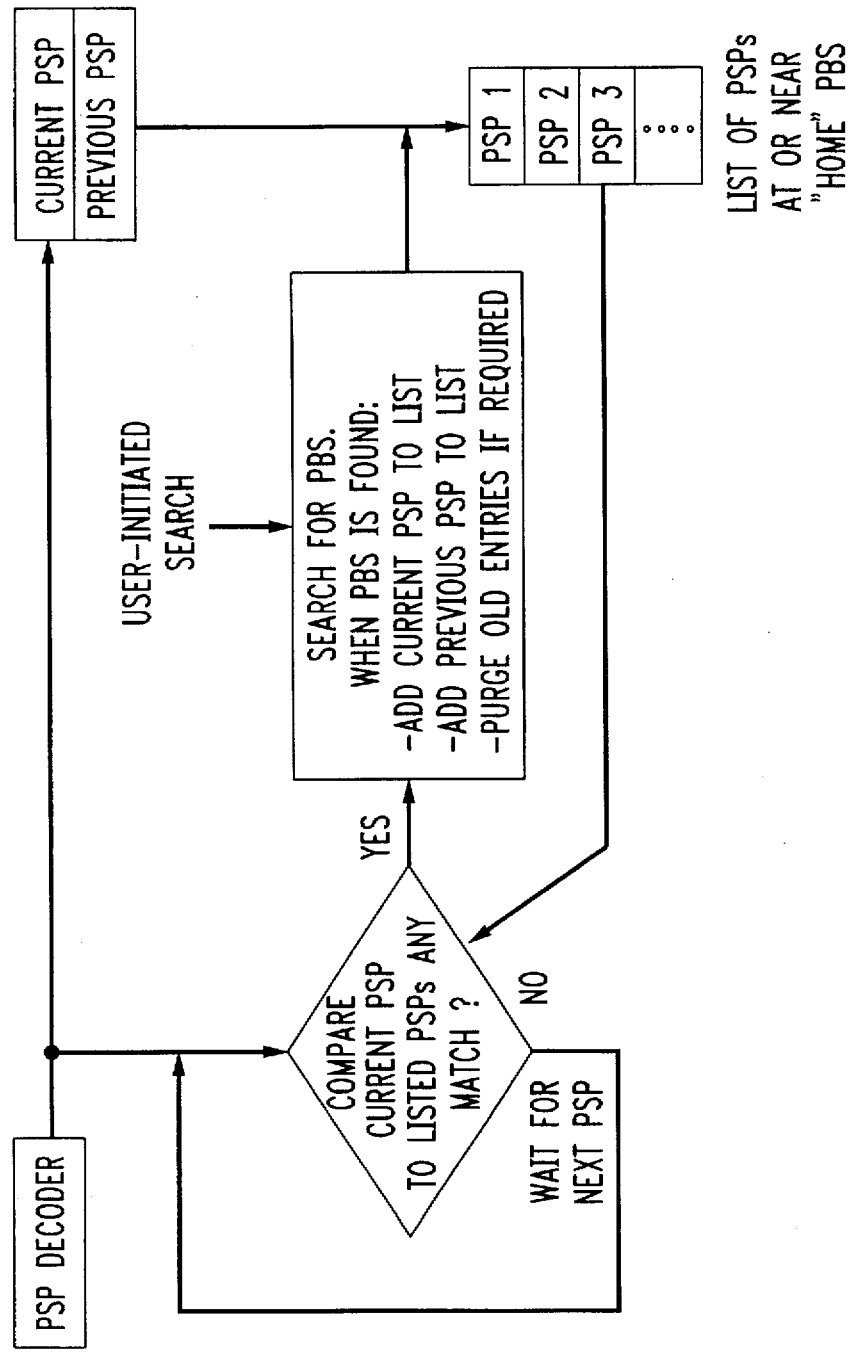
FIG. 13 is a detailed software functional diagram of the controller portion of the wireless communication unit of FIG. 1 operating the method of the present invention.

The specific mechanism of the software that is contained in the Modem DSP/PSP Decoder 24 that is used to automatically switch the control communication from a public network to a non-public network is seen in FIG. 13. Initially, for example, if the user traverses along the path "A", and since the remote unit 10 has never been "taught" to recognize the non-public base station 170, the first time that the switchover from the public network to the non-public network occurs, this switchover must be user-initiated. Assuming that the user traverses the path identified as "A", the switchover occurs when the user enters cell 160 having PSP="1" and enters the region 168 covered by the NPBS 170. If the switchover is successful, the controller 32 stores in the memory 31, PSP="1", as the identification signal of the cell from which the successful switchover occurred.

In addition, the controller 32 measure the difference in time between when switchover occurred and when the remote unit 10 first entered into cell 160. The clock signals from the clock 92 are measured by the controller 32. In the preferred embodiment, if the difference in time between when the remote unit 10 first entered first cell 160 and when switchover occurred is less than two (2) minutes, then the PSP of the previous cell, i.e. PSP=3 of cell 164, is also stored in memory 31. Thus, assuming that it took less than two (2) minutes for the remote unit 10 to first enter cell 160 until when switchover occurred along path "A", then the memory 31 would store PSP="1" and PSP="3".

At a subsequent occurrence, if the remote unit 10 traverse along path "B", the remote unit 10 would first enter cell 162 having PSP="2". Although a portion of cell 162 is covered by the broadcast region of the NPBS 170, since PSP="2" is not a recognized PSP for switchover as stored in the memory 31, no switchover occurs. However, upon entering the cell 160 having PSP="1", the controller 32 recognizes that it matches the PSP="1" stored in the memory 31. The remote unit 10 attempts to initiate switchover. Since the remote unit 10 would already be in region 168 covered by NPBS 170, switchover would occur almost immediately. Since, it took less than two (2) minutes for the remote unit 10 to traverse path "B" from when it first entered cell 160 until switchover occurred then PSP="2" (the PSP of a previous cell 162) would also be stored in the memory 31.

Finally, in a third example, if the remote unit traversed the path "C", it would first enter into cell 166 having PSP="4".

Since PSP="4" does not match any of the PSP stored in memory 31, controller 32 would not attempt to initiate switchover. Once the remote unit 10 enters into cell 162 having PSP="2", the controller 32 would find a match with one of the PSPs stored in the memory 31. It would then initiate an attempt at switchover. However, because the location at which the remote unit enters cell 162 is not covered by the region 168 of the NPBS 170, switchover would not occur immediately. Instead, the unit 10 would continue to attempt to initiate switchover until the remote unit 10 entered into region 168 overlapping with cell 162. At that point in time and location, switchover would successfully occur. Assuming that it took less than two minutes from the time when the remote unit 10 first entered cell 162 until switchover occurred, the PSP (=4) of the previous cell 166 would also be stored in memory 31.

From the foregoing, it can be seen that with the apparatus and the method of the present invention, the remote unit 10 has the capability of "learning" the identity of public cells at or near a NPBS region.

When initiating switchover, the controller 32 sends a switchover signal to the switch 13 thereby switching the connection of signals from, for example, RF 14a to base unit 20, to RF 14b to baseband processor 20. In addition, the switchover signal is sent to the two transistors 15a and 15b, cutting off power to RF 14a and supplying power to RF 14b. Each of the RF units 14a and 14b could transmit and receive radio wave signals at different frequencies or different protocol. If the RF unit 14b does not receive RF signals from NPBS 170, then the controller 32 would send a switchover signal to return the communication to the public network. Thereafter, periodically, on the order of once per several seconds, the controller 32 would initiate attempt at switchover again by generating the switchover signal again. If after at least two (2) minutes of attempted switchover it does not occur, then the previous PSP is purged from the memory 31.

Thus, for example, if PSP=1 is stored in memory 31, and the remote unit 10 traversed path "D" with the amount of time the unit 10 is in cell 166 being greater than two minutes, without switchover occurring, then PSP=1 would be deleted from memory 31.

Furthermore, to expedite the checking of a PSP of a current cell, with the PSPs stored in memory 31, the PSPs stored in memory 31 can be ranked by the order of frequency of occurrence. Thus, if PSP="1" occurs most frequently, then it is ranked first. Upon receiving a PSP from a cell, the controller 32 would check with the memory 31 to determine if there is a match with the first ranked PSP. The order of frequency assures that the most frequently occurred cell from which switchover has occurred in the past would be tested first. In addition, of course, the PSPs can also be stored in memory 31 based upon the ranking of the most current or recent occurrences of the switchover.

Although the embodiments shown in FIG. 1 describes two separate RF units (14a and 14b) with each of the RF units shown in greater detail in FIG. 4, it should be appreciated by those skilled in the art that many of the components of RF unit 14a and 14b are in common and that those common components need not be duplicated in RF unit 14a and RF unit 14b. Finally, of course, the time period of two (2) minutes, as discussed herein was arbitrarily chosen, and the invention is not limited to such a time period.

What is claimed is:

1. A mobile telecommunicating device for communicating wirelessly with a plurality of base stations of a first kind, in a first communication protocol, and for communicating wirelessly with at least a base station of a second kind, in a second communication protocol, wherein each of said plurality of base stations of said first kind and said base station of said second kind transmits and receives wireless signals to and from a respective region, with a region of one base station of said first kind overlapping a region of said base station of said second kind, and wherein each of said plurality of base stations of said first kind transmits a distinctive identification signal, said device comprising:

means for receiving each of said distinctive identification signal in said first protocol, from each of said plurality of base stations of said first kind, as said mobile telecommunication device travels through the respective regions of said plurality of base stations of said first kind;

means for storing a first distinctive identification signal transmitted by said one base station of said first kind and for storing a previous distinctive identification signal, said previous distinctive identification signal being a distinctive identification signal received by said device within a predetermined time prior to a current distinctive identification signal received, said current distinctive identification signal received being a distinctive identification signal currently received by said device; and means for comparing said distinctive identification signal received by said device to previously stored distinctive identification signals and to attempt to initiate communication in said second communication protocol in the event of a match.

2. The device of claim 1 further comprising:

timing means for measuring a predetermined period of time; and wherein said storing means purges said previous distinctive identification signal in the event said device does not receive said current distinctive identification signal within a time period at least equal to said predetermined period of time.

3. The device of claim 2 wherein said storing means further stores a second distinctive identification signal, said second distinctive identification signal transmitted by a base station of said first kind, whose associated region overlaps said region of said one base station of said first kind, and wherein said comparing means further comprising:

means for comparing said current distinctive identification signal to said first distinctive identification signal, and for comparing said previous distinctive identification signal to said second distinctive identification signal, and in the event of a match in either comparison, attempt to initiate communication in said second communication protocol.

4. The device of claim 1 wherein said first communication protocol is in a first frequency.

5. The device of claim 1 wherein said second communication protocol is in a second frequency, different from said first frequency.

6. The device of claim 1 wherein said plurality of base stations of said first kind comprise a public carrier communication network.

7. The device of claim 6 wherein said base station of said second kind comprises a non-public communication network.

8. The device of claim 1 wherein said region of said base station of said second kind, overlapping with a plurality of regions of base stations of said first kind.

9. The device of claim 8 wherein said storing means further stores a second distinctive identification signal, said second distinctive identification signal transmitted by another base station of said first kind, whose associated region overlaps said region of said base station of said second kind.

10. The device of claim 9 wherein said comparing means further compares said distinctive identification signal received by said device to said second distinctive identification signal stored and to attempt to initiate communication with said base station of said second kind in the event of a match.

11. A method of changing wireless communication between a mobile unit and a first base station of a plurality of base stations of first kind, in a first communication protocol, and between said mobile unit and a base station of a second kind in a second communication protocol, wherein each of said plurality of base stations of said first kind and said base station of said second kind transmits and receives wireless signals to and from a respective region, with said region of said first base station of said first kind overlapping said region of said base station of said second kind, and wherein each of said plurality of base stations of said first kind transmits a distinctive identification signal, said method comprising:

storing by said mobile unit, through user activation, a first distinctive identification signal transmitted by said first base station of said first kind;

receiving by said mobile unit each of said distinctive identification signal in said first communication protocol, from each of said plurality of base stations of said first kind, as said mobile unit travels through the respective regions of said plurality of base stations of said first kind;

storing, by said mobile unit, a previous distinctive identification signal, said previous distinctive identification signal being a distinctive identification signal received by said mobile unit within a predetermined time prior to a current distinctive identification signal received, said current distinctive identification signal being a distinctive identification signal currently received by said mobile unit; and comparing said distinctive identification signal received by said mobile unit to previously stored distinctive identification signals and to attempt to initiate communication in said second communication protocol in the event of a match.

12. The method of claim 11 further comprising:

measuring a predetermined period of time; and purging said previous distinctive identification signal in the event said mobile unit does not receive said current distinctive identification signal within at least a time period equal to said predetermined period of time.

13. The method of claim 12 further comprising:

storing a second distinctive identification signal, said second distinctive identification signal transmitted by a base station of said first kind, whose associated region overlaps said region of said first base station of said first kind;

comparing said current distinctive identification signal to said first distinctive identification signal, and in the event of a match;

comparing said previous distinctive identification signal to said second distinctive identification signal; and attempting to initiate communication in said second communication protocol, in the event of a match in either of said comparing steps.

14. The method of claim 11 wherein said first communication protocol is in a first frequency.

15. The method of claim 11 wherein said second communication protocol is in a second frequency, different from said first frequency.

16. The method of claim 11 wherein said plurality of base stations of said first kind comprise a public carrier communication network.

17. The method of claim 11 wherein said base station of said second kind comprises a non-public communication network.

18. The method of claim 11 wherein said region of said base station of said second kind, overlapping with a plurality of regions of base stations of said first kind.

19. The method of claim 18 wherein said storing step further stores a second distinctive identification signal, said second distinctive identification signal transmitted by a second base station of said first kind, whose associated region overlaps said region of said base station of said second kind.

20. The method of claim 19 wherein said comparing step further compares said distinctive identification signal received by said mobile unit to said second distinctive identification signal stored and to attempt to initiate communication with said base station of said second kind in the event of a match.

21. The method of claim 20 further comprising the step of ranking said stored first and second distinctive identification signals based upon frequency of occurrence.

22. The method of claim 20 further comprising the step of ranking said stored first and second distinctive identification signals based upon more recent occurrence.

23. The method of claim 22 further comprising the step of determining a predetermined period of time; and purging a distinctive identification signal stored in said mobile unit in the event of absence of a match within said predetermined period of time.

24. A method of operating a portable communication device for switching communication between said device and two wireless networks, each of said networks transmitting a characteristic signal, said method comprising, monitoring characteristic signals transmitted by one of said two wireless networks;

storing characteristic signals of said one network, when a user activates switching in communication from said one network to another of said two wireless networks;

communicating wirelessly with said one network, while monitoring characteristic signals thereof;

storing a previous distinctive identification signal, said previous distinctive identification signal being a distinctive identification signal monitored by said portable communication device within a predetermined time prior to a current distinctive identification signal being monitored, said current distinctive identification signal received being a distinctive identification signal currently received by said device comparing said characteristic signals monitored while communicating with said one network with previously stored characteristic signals, and attempting to initiate communication automatically with said another network in the event of a match in said comparing step.

25. The method of claim 24 further comprising:

measuring a predetermined period of time; and purging said previous distinctive identification signal in the event said portable communication device does not receive said current distinctive identification signal within a time period at least equal to said predetermined period of time.

26. The method of claim 24 wherein communication with said first wireless network is in a first frequency.

27. The method of claim 26 wherein communication with said second wireless network is in a second frequency, different from said first frequency.

28. The method of claim 24 wherein said first wireless network is a public carrier communication network comprising a plurality of base stations each base station communicating within a cell.

29. The method of claim 28 wherein a plurality of cells of said first wireless network overlap said region of said second wireless network.

30. The method of claim 29 wherein each of said plurality of base stations of said first wireless network transmits a distinctive identification signal, with said characteristic signals being said distinctive identification signals.

31. The method of claim 24 wherein said second wireless network is a non-public communication network comprising a base station communicating within a region.

* * * * *